Patented Jan. 6, 1942

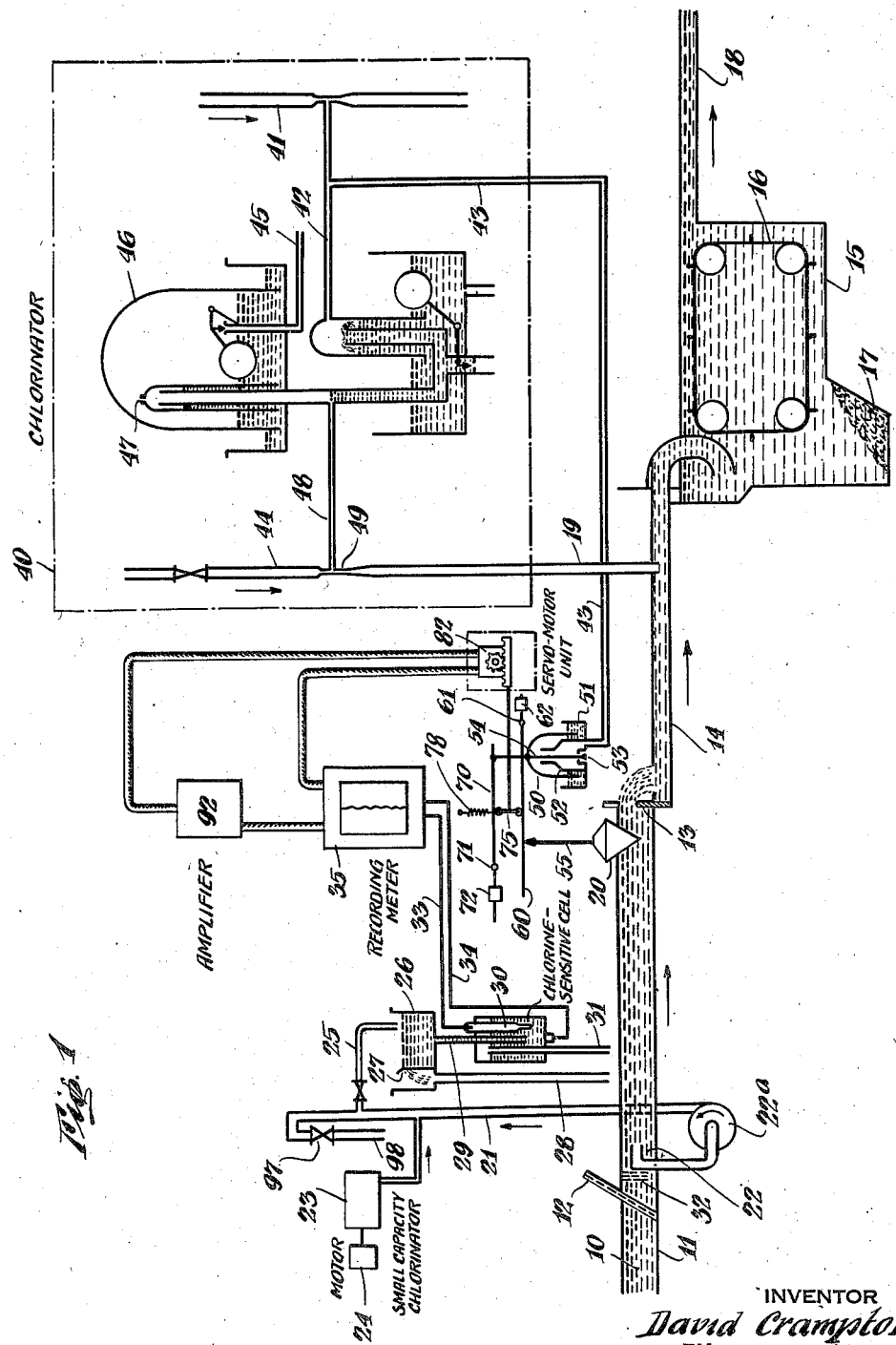

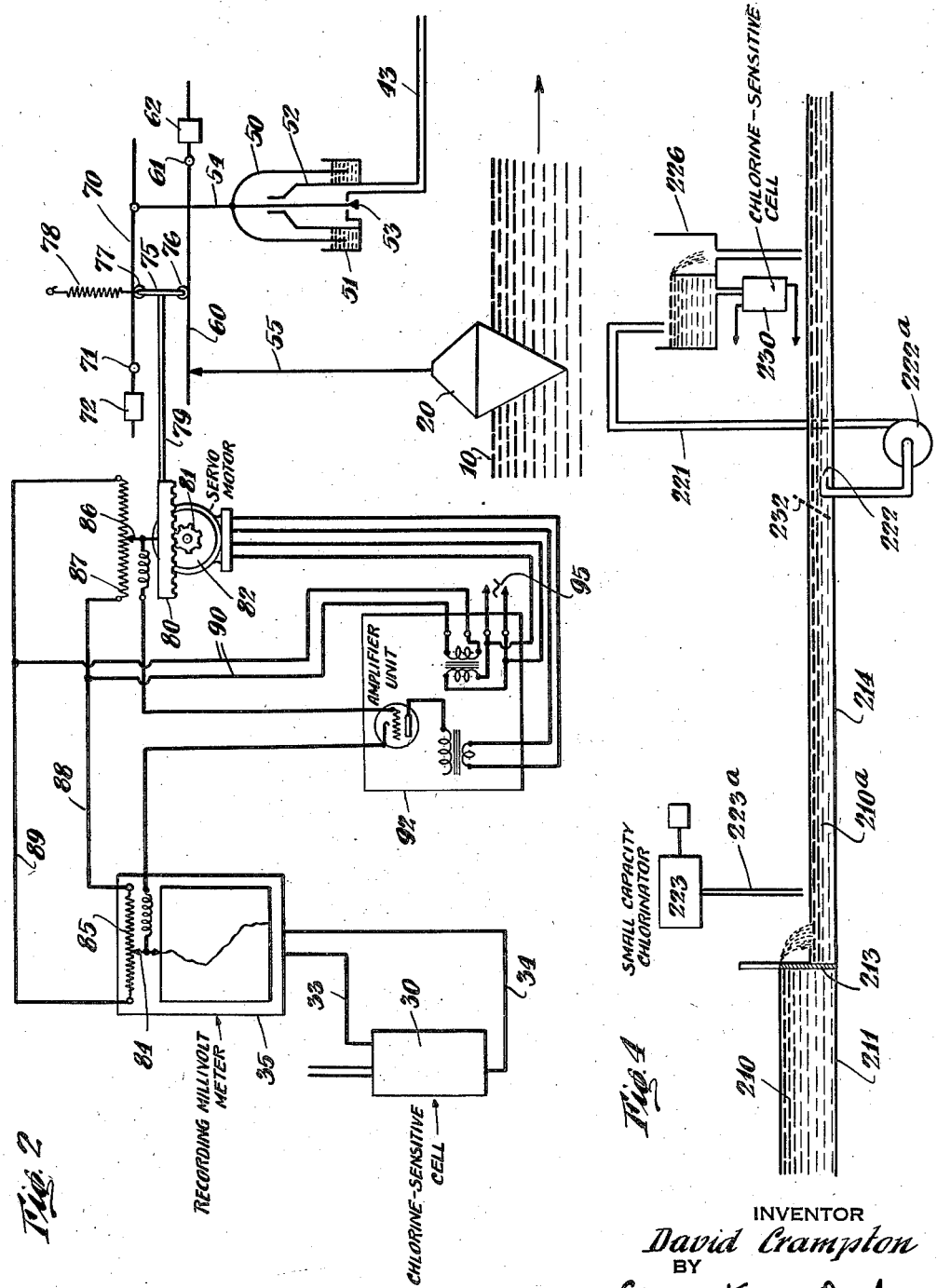

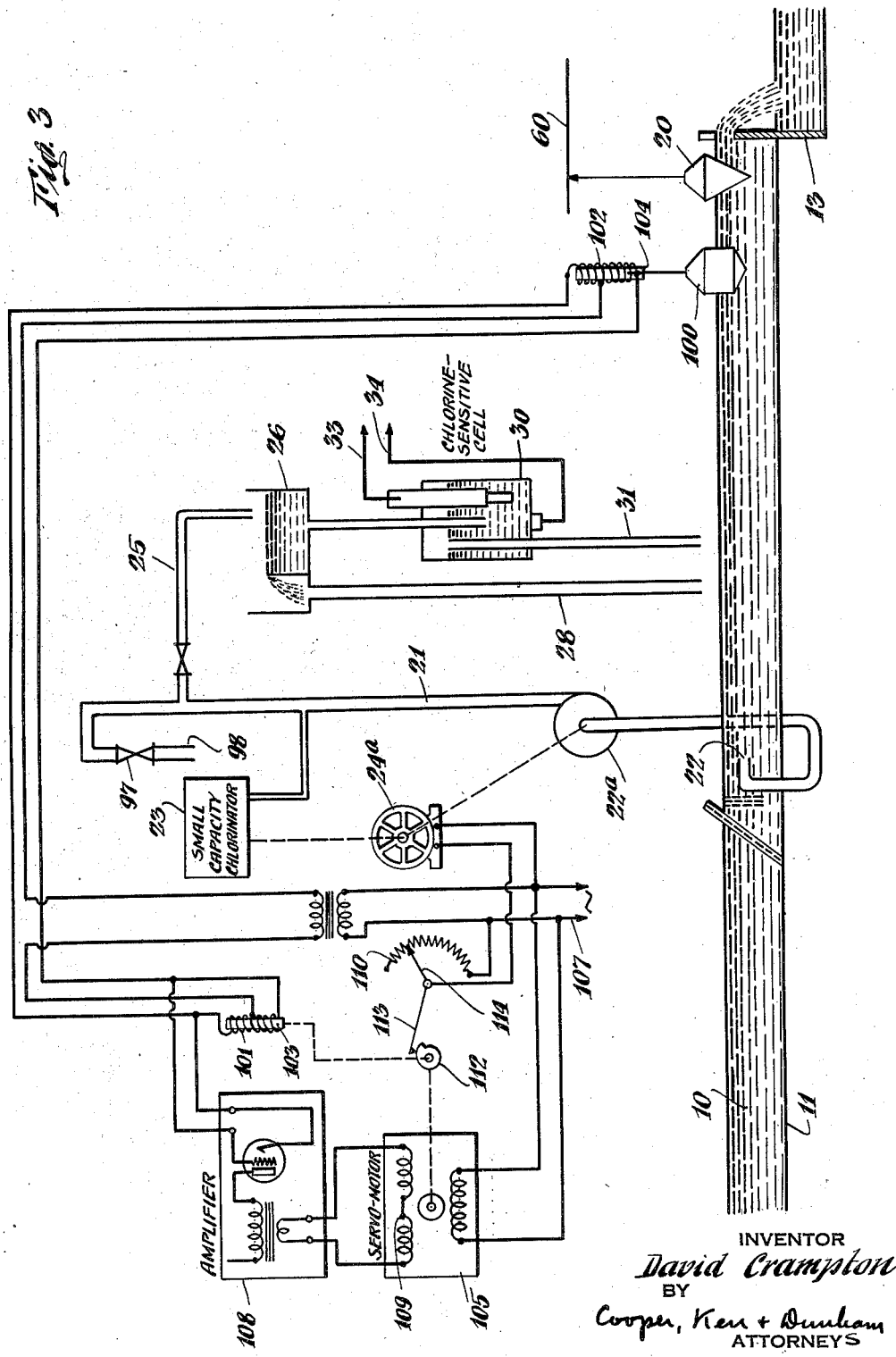

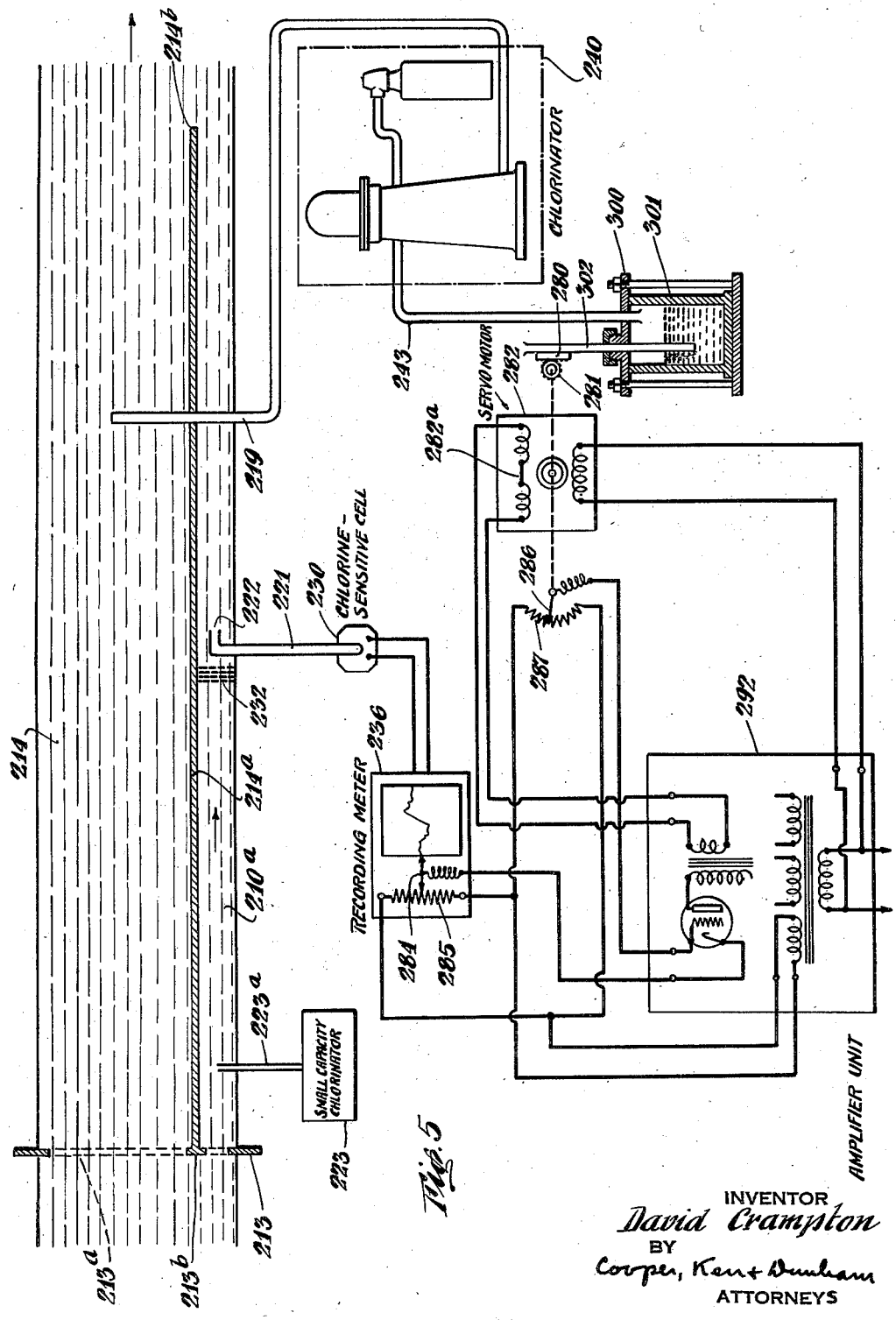

2,269,393

UNITED STATES PATENT OFFICE 2,269,393

PROCEDURE AND APPARATUS FOR CONTROLLING THE TREATMENT OF FLOWING MATERIAL

David Crampton, Montclair, N. J., assignor to Wallace & Tiernan Co. Inc., Belleville, N. J., a corporation of New York Application April 7, 1939, Serial No. 266,595

23 Claims. (Cl. 210—28)

This invention relates to procedure and apparatus for controlling the treatment of flowing material, especially treatments such as the addition of chemicals or the like to a moving body of liquid, wherein there may be variation both in the rate of flow, i. e. the quantity of material presented for treatment per unit of time, and in the demand of the material for treatment per unit quantity, e. g. the amount of treating substance needed per unit quantity to obtain a desired result. Accordingly an important object of the invention is to provide improved control procedure and systems which are adaptable to such conditions and which will afford a sensitive and accurate control of the treatment in proportion to both of the desired types of variation.

Another object of the invention is to provide for demand-proportioned control with a minimum of hunting or fluctuation of response, in contrast to common types of control systems wherein the rate of treatment is controlled by readings of the result of treatment after the latter has been made. Although theoretically of an average accuracy, systems of the prior type just mentioned usually have a bad tendency to hunt, and indeed as a result of the hunting or of factors that contribute to hunting, a desirable accuracy of response is often difficult or impossible to obtain. The present invention, however, is designed to provide both an improved accuracy of response and an avoidance of hunting, by methods and means which are advantageously adapted for continuous operation to obtain an accurately uniform treatment of the material.

A further object of the invention is to provide new and improved methods and apparatus for controlling the chlorination of aqueous liquids such as sewage, water supply or the like. For example, in sewage disposal plants chlorination is often desired, for one or more of several reasons,—as to prevent odor formations, or to reduce the bio-chemical oxygen demand of the effluent. In practice, chlorination for odor control is frequently effected by applying chlorine to the fluid entering the plant before the settling basins and filters, while for bio-chemical oxygen demand reduction, chlorine is often applied just ahead of final settling.

In most sewage plants, the flow is variable over wide limits even during short periods of time, and the variations in rate of flow are sometimes aggravated by the use of intermittent pumps. Furthermore, the chlorine demand per unit quantity of material often varies over wide limits, and very rapidly, during both day and night operation; and this type of variation, as well as variation in rate of flow, may be experienced even in the largest plants where some mixing can occur prior to the arrival of the material at the plant. Heretofore, control in accordance with rate of flow has been achieved by the use of flow-responsive devices, and it has also been sought to control the chlorination by taking readings of the residual chlorine content of the sewage after the application of chlorine and after its intended reaction has been substantially completed. However, the time for such completion of reaction is apt to be relatively long, and further time may also elapse in bringing the sample to the measuring device in cases where continuous measuring apparatus is employed. This total period, principally accounted for by time of reaction, may be anywhere from 2 to 10 minutes or more, and thus if the chlorination controller is actuated by the described measurement of the treated material, its control is always from 2 to 10 minutes or more behind the actual changes in chlorine demand which are presented at the point of chlorine application.

As a result the control is inaccurate and if it is possible to make a basic adjustment of the chlorination to maintain an excessive average of residual chlorine (so that the necessary results may be obtained regardless of rapid variation in demand), there is a considerable waste of chlorine; and in any event the system is apt to hunt badly. The present invention, therefore, aims to provide control systems and procedure for chlorination of sewage and other aqueous liquids, or for other application of treating material which requires a considerable period of time before detection of results is practicable, wherein accuracy of response, avoidance of hunting and economy of the chlorine or other treating substance are achieved.

Other objects and advantages include those which are hereinafter stated or which are incidental to the use of the invention as hereinafter described.

Certain presently preferred embodiments of the invention are shown, by way of example, in the accompanying drawings, wherein:

Fig. 1 is a diagrammatic view of a control system for the application of chlorine in the treatment of sewage or the like;

Fig. 2 is an enlarged diagrammatic view of certain parts of the apparatus shown in Fig. 1;

Fig. 3 is a diagrammatic view of a modification in certain portions of the apparatus of Fig. 1;

Fig. 4 is an elevational view in diagrammatic form, of a modified system of the invention; and Fig. 5 is a diagrammatic view showing certain further elements of the system of Fig. 4 and illustrating the features of Fig. 4 in plan view.

Referring first to Figs. 1 and 2, the invention is illustrated as applied to a sewage plant, or portion thereof, wherein the sewage 10, industrial waste or like liquid to be treated, enters the control and treating zones in a conduit, e. g. an open channel 11, passes through a screen 12, and flows over a weir 13, into a further channel 14, through which it flows, for example, to a primary settling basin 15. The settling basin, for instance, may be of the continuous type having slow moving paddles 16, on a suitable conveyor, which push the settled materials to a sump 17, where they may be dumped off for further treatment; and the resulting partially clarified liquid flows on through an outlet channel 18. In the example illustrated chlorine is applied through the pipe 19 which opens into the channel 14 at a point ahead of the primary settling basin; but it will be understood that in some cases chlorination of the flowing material may be affected at other points than in a channel or pipe—e. g., at a basin or tank into which the liquid is constantly or intermittently flowing, or from which it is so flowing, or through which it is flowing (as in the case of the illustrated settling basin 15).

To provide for control in accordance with rate of flow, a float 20 is disposed in the stream of sewage 10 at the point where it overflows the weir 13, and it will be readily appreciated that the upward force exerted by the float (which is restrained, by means hereinafter explained, from appreciable movement) will vary in response to variations in the rate of flow of the liquid, i. e. its flow over the weir. In the illustrated system, the chlorinator controlling arrangements are such as to require that the variations of force exerted by the float be proportional to the square of the rate of flow; and such control may be obtained by utilizing a weir float 20 which is of special conical configuration, thus cooperating, for the aforesaid purpose, with the otherwise existing relation between flow and float displacing force, as will be understood by those skilled in the art.

An important feature of the invention is that the rate of chlorination is controlled not only in accordance with variations in flow, but also in accordance with variations in chlorine demand of the liquid per unit quantity, as detected in the untreated liquid sampled from a point upstream of the place of chlorine application. To that end, a pipe 21, having an outlet 22 into the stream of sewage 10 as the latter passes along the channel 11, and having an operating pump 22a, continuously draws off sample portions of the fluid. A small capacity chlorinator 23, which may be of known design and which may be operated by a motor 24, serves to inject chlorine into the sample flow at a constant amount per unit quantity of the sample, and conveniently at an extent which is slightly higher than the maximum chlorine demand of the material treated in the plant (although in some cases the apparatus can be operated with a fixed flow of chlorine above or below the preferred adjustment just mentioned). The chlorine-treated sample then passes through a further conduit 25 to an overflow box 26, which has a constant-level edge or weir 27 over which excess liquid may flow and be returned to the main stream through pipe 28.

The overflow box 26 thus maintains a constant head for the liquid in it and from the bottom of the box 26, at the described constant head, a small sample of the chlorine-treated liquid flows down through a pipe 29 into a measuring cell 30 for detection of the residual chlorine content. The cell 30 may conveniently be an electrolytic device of the type shown and described in United States Patent No. 2,076,964, issued April 13, 1937, to Richard Pomeroy for Process and apparatus for water purification; or, for instance, it may be or include a device of the types invented by Charles F. Wallace,—for example, electrical cell apparatus of types disclosed and claimed in his copending applications Serial Nos. 263,659 and 263,660, filed March 23, 1939, for Fluid electrodes and for Cells and systems for use in the control of compositions of fluids, respectively. It will be understood that such devices afford a measurement of a potential which can be correlated to the amount of residual chlorine in the treated liquid per unit quantity. It will be noted that the cell 30 is conveniently provided with a constant-level outlet pipe 31, whereby a constant level is maintained in the cell and the excess liquid flows back to the main stream in the channel 11.

It is particularly desirable to keep the line 21 and other parts of the sampling and testing instrumentalities free of obstructions; to that end, the inlet 22 is located downstream of the sewage screens 12, and may be specially protected with further screens as indicated by the dotted lines 32. In some cases, a periodic flushing of the sample line 21—25 may be desirable in order to remove solid matter or other obstructions lodged therein.

It will be understood that the sample removed from the channel 11 by the pump 22a is preferably small in relation to the extent of the main stream; and the relative positions of the outlet of the chlorinator 23 and the measuring cell 30 are conveniently selected so that a desirably complete reaction of the chlorine upon the sample will have taken place by the time the latter reaches the cell.

The electrical output of the cell 30, comprising a pair of leads 33—34 having a potential between them which is dependent upon the residual chlorine content of the tested sample, is connected to a sensitive translating device which may conveniently have recording means for making a continuous record of the cell reading. For this purpose, a recording potentiometer, e. g. a recording millivoltmeter of the potentiometer type, is shown in the drawings and generally designated by the reference number 35.

Before describing the further connections of the instrumentalities controlled by the cell 30, the means for controlling the chlorinator in accordance with variations of flow may conveniently be described. The chlorinator generally designated by the box 40 may advantageously be of the type illustrated in United States Patent No. 1,777,987, issued October 7, 1930, to Charles F. Wallace, for Apparatus for treating water, and the principal instrumentalities diagrammatically shown within the box 40 are identical with those appearing in the upper part, and the extreme left hand side of the lower part, of Fig. 6 of the cited patent. In view of the disclosure of the patent it will be sufficient to point out that by means of an aspirator 41 a vacuum is produced in the connected lines 42 and 43. Variations in the extent of this vacuum or negative pressure serve to control the amount of chlorine introduced into the liquid which flows through line 44—19 and thus carries the chlorine to the sewage channel 14; it being understood that the chlorine itself enters the apparatus through line 45 into the interior of bell 46 where it is kept at a slight negative pressure and whence it passes through the metering orifice 47 and line 48, to be drawn into the stream traversing pipe 44 by an aspirator or injector 49. These and associated instrumentalities are described in the cited Wallace patent, to which reference may be had for further explanation of the means whereby variations in the vacuum or negative pressure of line 43 serve to control the amount of chlorine injected into the sewage by line 19.

The vacuum control line 43 opens into the interior of a bell 50, which has its lower edge sealed in a pool of suitable liquid, e. g. mercury, in the lower part of a containing vessel 51. The vacuum chamber provided by the bell has a lower stationary portion 52 and an outlet provided with a control valve 53. The valve 53 is adapted to be operated by a rod 54 which extends through and in sealed connection with the top of the bell 50 in such way that as the rod is pulled up, the valve 53 is brought more closely into its seat, and vice versa; whereby the valve is opened or closed in varying degree relative to the atmosphere, and consequently provides a variation of the amount of vacuum within the bell 50 and thus within the lines 42 and 43. Vacuum-controlling instrumentalities of this general type are shown and described in the above cited Wallace Patent No. 1,777,987, and also in greater detail in United States Patent No. 1,762,706 to Charles F. Wallace, issued June 10, 1930, for Apparatus for producing a proportionately varying negative pressure.

In order to effect vertical adjustment of the rod 54 both in accordance with variations of flow and variations in chlorine demand per unit quantity, the following instrumentalities, shown in Fig. 2 in greater detail, may be provided: The float 20 is mechanically connected, as through rod 55, to exert force upwardly against one arm of a lever 60 which is pivoted at a fixed fulcrum 61 and provided with a counter-weight 62, so that the lever itself (apart from any force exerted by float 20) is in static balance about the pivot 61. A similar lever 70, oppositely arranged above lever 60, is pivoted about a fixed fulcrum 71 and provided with a counter-weight 72 so that it is likewise in static balance about its pivot. The rod 54 of the controlling bell device 50 is pivotally connected to the longer arm of lever 70 corresponding to the opposite connection of the flow-responsive rod 55 to the longer arm of lever 60. A laterally displaceable pivot 75 is disposed intermediate the levers 60 and 70 for transmitting force between them and conveniently includes rollers 76 and 77 respectively engaging the upper surface of lever 60 between rod 55 and fulcrum 61, and the under surface of lever 70 between the rod 54 and fulcrum 71. It will now be seen that slight vertical displacement of the float 20, occasioned by a change in the flow of sewage, will affect a proportional vertical displacement of the rod 54 through the systems of levers just described, and consequent adjustment of valve 53 and the controlling vacuum within the bell 50.

It will also be noted that the position of the rod or link 54 (and consequently valve 53) for any given position of rod 55, will depend upon the location of the pivot 75. For example, if the pivot 75 is moved to the left, the closing force transmitted to the rod 54 is decreased, so that the valve will open more; and if the pivot is moved to the right, the upward force or rod 54 is increased, so that the valve is shifted toward closed position. Likewise, the effect of controlling variations in upward force exerted by the float 20, upon the valve 53, will vary in proportion to the positional adjustments of the pivot 75. It may be explained that the pivot member 75 is conveniently suspended by spring 78 or like means providing for a long circuit suspension, which prevents the weight of the pivot member and its associated parts from exerting any force on the levers, and yet permits the pivot to be moved freely in a horizontal, i. e. lateral direction. It will also be understood that the sensitive valve 53 and its control are advantageously such that very slight displacements thereof are ordinarily amply sufficient for the described control, under variation of force by (rather than appreciable movement of) the float 20.

For adjustment of the pivot 75, the body of the latter is secured to a light, rigid, horizontally-extending rod or arm 79 carrying a rack 80. A pinion 81, driven by a servo-motor 82, is in mesh with the rack 80, so that upon rotation of the gear 81, the rack 80, and consequently the pivot 75, are moved to the right or left, depending upon the direction of rotation of the gear 81. It will be understood that although shown as directly driven, the gear 81 may, if desired, be driven from the motor by suitable reduction gearing, to provide more sensitive response in certain cases.

For control of the motor 82 in accordance with the readings of the cell 30, the recording arm or like element of the meter 35 is adapted to shift a contact arm 84 along a resistor 85, in accordance with the meter reading. A similar contact arm 86 is arranged to be shifted by the assembly of rack 80 and arm 79, along a like resistor 87. The terminals of resistor 85 are conveniently connected to the corresponding terminals of resistor 87, and a source of alternating potential is applied between their connecting leads 88, 89, by means of the leads 90. The adjustable contact arms 84, 86 are respectively connected to the input terminals of a suitable amplifier unit, such as a vacuum tube amplifier 92, and the amplifier is so constructed and so connected to the servo-motor 82 that the latter will drive the resistance arm 86 in one direction or the other, as necessary, to cause the arm 86 to follow up the displacements of arm 84.

That is, the circuit of the resistors 85, 87, and the associated contact arms 84, 86, provide a bridge across the input of the amplifier; normally, the bridge circuit is in balance and the motor 82 controlled by the amplifier does not run. If the bridge is unbalanced, as by displacement of the recorder arm 84 (under control of the cell 30), the motor 82 will be caused to run until its resulting adjustment of the contact arm 86 restores balance in the bridge circuit, whereupon the motor stops. At the same time, the concomitant displacement of arm 79 by the motor effects a lateral displacement of pivot 75 which is proportional to the controlling displacement of the recorder arm 84, and thus to the residual chlorine content of the sampled sewage, as determined by the cell 30. As will be understood, the connections are such that upon increase in residual chlorine,—i. e. excess chlorine after the reaction of treatment,—the displacement of the pivot member 75 is to the left (as seen in the drawing), for decrease of the vacuum in bell 50 and decrease of the rate of chlorination by chlorinator 40; and vice versa upon decrease of residual chlorine,—the chlorination control being thus proportioned to the demand, to which the amount of residual chlorine in the sample is inversely proportional.

For particularly efficient results, the servo-motor 82 may conveniently comprise a shading coil motor, having a field winding (not shown) supplied from an alternating current line 95 (which through a suitable transformer supplies alternating current to the line 90) and having normally opposed sets of shading coils which are connected for energization by the amplifier to cause rotation of the motor when there is an unbalance in the control circuit previously described. Amplifier-controlled apparatus of this general character, suitable for use in the system here shown, is described and claimed in the copending application of John R. MacKay, Serial No. 74,895, filed April 17, 1936, for Motor control apparatus. For convenience, the present drawings show certain elements of these controlling instrumentalities, such as the amplifier and the motor, in a very simplified and diagrammatic form, and for more detailed illustration and explanation, reference may conveniently be had to the cited MacKay application.

It will be understood that although the described means are at present preferred because of their rapid response and nonhunting character, other kinds of instrumentalities may be employed for causing the pivot 75 and its arm 79 to follow-up the movements of the recorder arm 84, or for other like controls hereinafter described; indeed, in the kind of circuit shown, other control means than variable resistors,— e. g. variable inductors,—may be employed, as in the manner specifically illustrated in the cited MacKay application.

As in part already explained, residual chlorine indicating cells of the type herein identified, and described for instance in the above cited Pomeroy Patent No. 2,076,964, normally operate as follows: If there is a considerable excess of chlorine in the tested sample, the electrical reading will be positive and high. As the amount of excess chlorine is decreased (e. g., by reason of a demand for chlorination at a higher rate in the present systems) the cell reading becomes proportionately less; and in cases where the device is operated in such way that the chlorine demand of the sample may exceed the supply, the reading of the cell may actually become negative, and afford corresponding change in control as in the case of a decrease of positive reading.

The controlling operations, as carried out with the apparatus illustrated in Figs. 1 and 2, will now be understood to be as follows: As the sewage 10 flows in along the channel 11, it is continuously sampled through the line 21 and continuously receives an application of chlorine, at a predetermined constant extent per unit quantity, from the small chlorinator 23. Reaching the cell 30 at a constant head, after a period of time sufficient to provide a suitable of reaction, the chlorinated sample is tested for its residual chlorine content by the cell. By means of the recorder 35, servo-motor 82 and the intermediate controlling instrumentalities, variations in chlorine content are translated into positional variations of the pivot 75; e. g., as the residual chlorine content increases, indicating a decrease in demand per unit quantity, the pivot is moved to the left (as seen in Fig. 2), and as the residual chlorine content decreases, indicating an increase in demand per unit quantity, the pivot is correspondingly displaced to the right. At the same time, variations in the displacing force exerted by the float 20, responsive to changes in flow of the sewage, are received by the conversion levers 60—70, and in consequence the valve 53 is positioned in accordance with variations in rate of flow as well as variations in demand per unit quantity of the liquid. As previously explained, variations in the position of the valve 53 varies the degree of vacuum, or negative pressure, within the bell 50 and lines 42 and 43, so as to produce corresponding variation in the rate of feed of chlorine to the sewage through the pipe 19.

By way of specific example, let it be assumed that the flow of sewage is at the rate of 100 gallons a minute, that there is a 3 inch head on the weir 13, and that the chlorinator is feeding at the rate of 10 pounds per 24 hours and has a metering device with a maximum capacity of 20 pounds of chlorine per 24 hours. In consequence of the structural arrangement shown, the vacuum differential across the chlorinator meter is 2 inches of water, and it may be further assumed that these conditions occur when the recorder 35 (under control of the cell 30) has a demand reading of 50 on a scale graduated from zero to a maximum of 100. Let it now be assumed that the demand reading suddenly increases to 75 on the recorder, with no change in flow; sudden and substantial changes in chlorine demand independent of flow, as well as rapid changes of flow more or less independent of chlorine demand, being characteristic of most sewage systems.

Following the displacement of the recorder arm 84 to a value of 75, the motor 82 will be operated to effect corresponding displacement of resistance arm 86 for restoration of balance in the bridge circuit. At the same time, the motor, through the instrumentalities of rack 80 and arm 79, will have moved the pivot member 75 proportionately to the right, i. e., toward the link 54. The resulting new position of the pivot increases the leverage of the float, and to balance the latter a greater pull is required of link 54. As a result, a larger vacuum (equal to 4½ inches of water) is produced under the bell, and in consequence the chlorinator increases the flow of chlorine, i. e., to a rate of 15 pounds per 24 hours. As previously explained, any change in rate of flow of the sewage which might occur at the same time is automatically taken care of, since the vacuum across the chlorinator metering orifice is always varied in proportion to the flow, although the control ratio may be varied, i. e., secondarily proportioned, by displacement of the pivot 75. In this connection, it will be noted that the position of the pivot 75 is governed only by the chlorine demand, and corresponds definitely to the extent by which the chlorine demand may be higher or lower, as the case may be, than a convenient control point (corresponding, say, to a reading of 50 on the recorder scale).

It will be understood that as the sewage travels from the sampling point 22 to the point of chlorine application by the pipe 19, a certain amount of time is necessarily consumed. Preferably, the sample line 21, pump 22a, and associated instrumentalities for delivering the chlorinated sample to the cell 30 are connected and arranged so that approximately the same time, or a little less, is consumed. That is, just as the treated sample reaches the cell 30, or conveniently very shortly after the treated sample reaches the cell 30, the portion of sewage from which that particular sample was withdrawn reaches, in the main flow, the locality of principal chlorine injection, and since the response of the meter 35 and the adjustment of the pivot member 75 are practically instantaneous, the chlorinator is then actually being adjusted under the control of that sample. In practice, with apparatus of the character illustrated, the system is ordinarily arranged so that the sample reaches the cell 30 at a time slightly ahead of the arrival of its parent portion (in the main flow) at the locality of pipe 19; thus the chlorinator has time to adjust itself, and the correspondingly increased or decreased supply of chlorine will arrive in the sewage in exactly timed relation with the actual change in demand.

As the rate of flow of the sewage changes, however, the time of its travel between pipes 21 and 19 will also change. In many cases, this variation is not of great importance; for instance, where a settling chamber 15 is employed, there is usually considerable mixing in it, and slight discrepancies between changes of chlorine application and changes in chlorine demand are ironed out in the settling chamber. In certain cases, however, it may be necessary to make some adjustment of the speed at which the sample arrives at the cell, in accordance with substantial changes in the rate of flow of the main body of sewage. Such adjustment can be obtained manually, for instance, by means of a throttling valve 97, conveniently disposed in an extension of the sample line beyond the pipe 25 which conducts the chlorinated sample to the cell. That is, the valve 97, through its associated outlet pipe 98, by-passes some of the sample to waste, or back into the channel 11, thereby slowing down the flow in the remaining section 25 of the sample line, it being understood that to facilitate such control, the pump 22a and chlorinator 23 may conveniently have a predetermined maximum adjustment, so that valve 97 can be opened to the extent necessary to reduce the flow in the sample line section 25 for suitable correspondence of the interval between sampling and testing with the interval between sampling and actual introduction of chlorine.

In some cases, automatic adjustment of the rate of sampling is desirable, and to that end apparatus such as illustrated in Fig. 3 may be employed. Certain elements and instrumentalities in Fig. 3 correspond, as will be appreciated on inspection, with parts shown in Fig. 1, and for convenience a number of parts are omitted (including the recording meter, conversion levers, chlorinator, and associated elements), which may be assumed to be the same as in Fig. 1. In Fig. 3 a single motor 24a is arranged, as diagrammatically indicated, to drive both the small capacity chlorinator 23 and the pump 22a. Under control of a flow-responsive device, such as a supplementary float 100 adjacent to the float 20, the speed of the motor 24a is varied in accordance with variations in the rate of flow of the sewage 10 through the channel 11.

Although other means to that end may be used, a preferred arrangement includes a pair of center-tapped inductances 101, 102, having adjustable cores 103, 104, respectively positioned by a servo-motor 105 and the float 100. The center-tapped inductances 101, 102 are conveniently arranged, as shown, in a bridge circuit which is adapted to be supplied with alternating potential from an alternating current line 107 and which is connected across the input of an amplifier unit 108, in the manner specifically illustrated and described in the above cited patent application of John R. MacKay, Serial No. 74,895. As likewise there disclosed, the output of the amplifier is adapted to energize the shading coils 109 of the servo-motor 105 in accordance with positional differences between the cores 103 and 104, so that the core 103 follows changes in position of the core 104 produced by vertical displacement of the float 100. At the same time, and likewise operated by the servo-motor 105, a speed controlling rheostat 110 in the circuit of the motor 24a is adjusted.

Unlike the float 20, the float 100 actually moves up or down, with variations in the rate of flow over the weir 13, and in order to compensate for the fact that the vertical displacements of the float 100 are not linearly proportional to the variations of flow (but vary as a function thereof which depends, as will be understood by those skilled in the art, on the specific design of the weir and the notch or the like therein), a suitable cam 112 and follower 113 are provided in the mechanical connection intermediate the motor 105 and the movable contact arm 114 of the rheostat 110; and in cases where adjustments of the rheostat and resulting speed variations of motor 24a may bear a non-linear relation, the cam 112 may also be constructed to compensate for such further non-linearity, as well. It will therefore be seen that variations in flow of the liquid through the channel 11 will effect corresponding variations in the rate of flow of the sample in the line 21, so that the desired timing between the arrival of the sample at the cell 30 and the arrival of the parent portion of the main flow at the pipe 19, is automatically maintained. At the same time, the test chlorinator 23 is correspondingly adjusted in rate, so as to maintain the desired constant extent of chlorination per unit quantity of the sample traversing the line 21.

For simplicity of illustration Fig. 3 shows a series motor 24a to operate the small chlorinator 23 and pump 22a, but it will be appreciated that if desired, other motors may be used instead, such as shunt or compound motors, which are usually more reliable and more accurately adjustable than the customary type of series motor. Thus for example, a D. C. shunt motor may be substituted for motor 24a, and have the variable resistance 110 connected in series with its field for accurate speed control; and if it is desired to energize such motor from the A. C. line 107, a rectifier can be interposed between the line and the motor, to provide the necessary direct current. It will also be understood that other arrangements than those shown in Fig. 3 may be employed to obtain automatic adjustment of the rate of sampling. For instance, in Fig. 1 a supplementary float (not shown), like the float 100 in Fig. 3, may be directly mechanically connected to adjust the valve 97 in accordance with variations in rate of flow of the stream 10; or the valve 97 may be similarly adjusted by a servo-motor (not shown) like the servo-motor 105 of Fig. 3, electrically controlled by the supplementary float in the same way as illustrated in Fig. 3,—such adjustment of the valve being conveniently effected through a compensating device such as the cam 112 in Fig. 3, for like compensation of non-linear control.

Although the illustrated examples are shown in connection with the chlorination of sewage at an early stage in the procedure commonly followed by sewage disposal plants, similar apparatus may be applied for controlling "post-chlorination," i. e., chlorination at a latter stage in the treatment, and in such case the tank 15 in Fig. 1 may be replaced by the final settling chamber. Similarly, in either case, the weir 13 and associated float 20 may sometimes be located below, i. e., down-stream of, the settling chamber, although in general more accurate results are obtained when the variations in flow are determined at a point ahead of such chamber. However, in effecting chlorination at the point of final settling in a sewage plant, the location of the flow-responsive device is usually of less importance since the most rapid variations of flow are usually much ironed out by passage through previous settling tanks and filters.

Figs. 4 and 5 illustrate another arrangement of the invention, whereby the rate of chlorine application or other treatment is automatically adjusted in accordance with pretested determinations of both chlorine demand and rate of flow, of the untreated material, and wherein a differential converter or like instrumentality, as embodied in the system of levers shown in Figs. 1 and 2, may be dispensed with. Referring to Figs. 4 and 5, which show the sewage channel respectively in elevation and plan, the sewage 210 to be treated advances in a channel 211 to a weir 213, over which it flows into a further channel 214. The weir 213, however, is constructed in two portions, having a major part 213a over which the main body of the sewage passes, and a separated minor part 213b over which a minor or sample portion of the sewage flows. The channel 214 is conveniently divided by a longitudinal partition 214a extending, for example, beyond the main point of chlorine application, so as to provide, in effect, a small parallel channel for the sample flow passing over the weir section 213b, the sample being returned to the main flow at the end 214b of the partition. By virtue of this arrangement, the speed of the sample 210a is the same as that of the main flow in the channel 214, i. e., is automatically proportioned in rate of flow to that of the main body of sewage.

A small capacity chlorinator 223, similar, for example, to the device 23 in Figs. 1 to 3, is arranged to inject chlorine into the sample flow 210a at the point 223a. At a place sufficiently downstream to permit suitable completion of the chlorine reaction for purposes of the test hereinafter described, liquid is withdrawn from the sample flow 210a by a sample line 221 having an inlet 222 suitably protected by screens 232 in a manner similar to the sample inlet 22 of Fig. 1. A pump 222a conveniently withdraws the sample through the line 221 at a constant rate and delivers it to a constant level box 226 (similar to the box 26 in Fig. 1), from which the chlorinated sample flows at a constant head into a residual chlorine indicating cell 230, like the cell 30 in Fig. 1. As the small standard chlorinator 223 is arranged to operate at a constant rate, i. e., to deliver chlorine to the sampling 210a at a constant predetermined amount per unit of time, it will now be appreciated that the quantity of residual chlorine as determined by the cell 230 varies both in accordance with variations in chlorine demand per unit quantity of the sewage, and in accordance with variations in rate of flow of the sewage.

That is, if the chlorine demand, for example, increases without any change in the rate of flow, the residual chlorine detected by the cell 230 will be less, while if the rate of flow increases (even though there may be no change in demand per unit quantity), the sample 210a will receive less chlorine per unit quantity, and the residual detected by the cell will also be less. Changes in an opposite direction will have a correspondingly opposite effect, and simultaneous changes in both factors will have a conjoint effect depending upon their respective needs for variation of the rate of chlorination of the main stream,— e. g., if an increase in the rate of flow is accompanied by a simultaneous decrease in the extent of chlorine demand per unit quantity in such mutual relation that no change in the rate of principal chlorination would be wanted, there will be no change in the amount of residual chlorine detected by the cell 230.

The chlorination of the principal stream of sewage can be achieved with a chlorinator 240 similar to that illustrated at 40 in Fig. 1, and dispensing chlorine-containing water into the stream through the pipe 219. Although other controlling devices may be used, such as the arrangement including the bell 50 shown in Figs. 1 and 2, together with means for adjusting the valve 53 inversely in accordance with the readings of the chlorine-sensitive cell (e. g., by substituting a spring for the float 20 and rod 55 in Fig. 2, whereby the valve 53 would be controlled only by member 75 under control of a cell-controlled recorder 35), Fig. 5 illustrates a somewhat different type of rate controller for effecting variations of the vacuum or negative pressure in the line 243,—the latter corresponding, as will now be understood, to the line 43 in Fig. 1, and similarly providing for control of the rate of chlorination in accordance with variations in the controlling vacuum.

The illustrated rate controller 300 comprises a sealed vessel 301 partially filled with liquid, e. g., water, and having an end of the vacuum pipe 243 opening within the container and above the surface of the water. A control tube 302 extends from below the surface of the water and is open to the atmosphere at its upper end, and is also arranged for displacement vertically so as to vary the distance to which its lower end is submerged in the water. It will now be appreciated that the amount of vacuum maintained in the line 243, under influence of an aspirator or like device in the chlorinator, will depend upon the submerged length of the control tube 302; and as the tube is adjusted, the extent of vacuum (measured in inches of water) will be correspondingly varied.

Vertical adjustment of the control tube 302 under control of the cell 230 may be readily effected, for example, in the same manner as the adjustment of the pivot 75 in Fig. 2. Thus the electrical output of the chlorine-sensitive cell 230 is connected to a recording meter 236, like the meter 35 in Fig. 2, for adjustment of a contact arm 284 along a resistor 285 in accordance with variations of potential corresponding to variations of residual chlorine. A servo-motor 282, having shading coils 282a energizable from the output of an amplifier unit 292, is connected to drive a gear 281 for operation of the rack 280 to displace the control tube 302. As in Fig. 2, movement of the motor 282 also effects follow-up displacement of a contact arm 286 along a resistor 287, the latter being connected with the resistor 285 to provide a normally balanced bridge circuit at the input of the amplifier 292, similar to that shown in Fig. 2. It will be understood that the resistor or slide wire 287 may be a tapered potentiometer,—or other compensating means may be included,—to convert the substantially linear movement of the recorder arm 284 to a square law movement of the arm 286 and tube 302 whereby the application of chlorine gas will be in direct ratio to the recorder reading.

It will now be seen that in Figs. 4 and 5, a sampling of the main stream of sewage is withdrawn in proportion to the rate of flow of the main stream, and the sample is subjected to a standard test chlorination at a predetermined fixed rate (preferably slightly above maximum possible demand), i. e., at a fixed extent per unit of time, so that the quantity of liquid receiving a given quantity of chlorine will naturally vary in proportion to variations of flow. The sample thus chlorinated is then allowed sufficient time to bring the reaction to a desired point of completion, whereupon it is tested for residual chlorine content per unit quantity, and the rate of application of chlorine to the main stream of liquid is then controlled inversely in accordance with the residual chlorine content thus determined. The control of the chlorinator by the cell is thus similar to the control exerted by the cell 30 in Figs. 1 and 2 (i. e., inversely in accordance with the quantity of residual chlorine) but instead of being related only to the demand per unit quantity, it automatically includes such modification as is necessary to account for changes in rate of flow.

It will be understood that the point of application of chlorine through pipe 219 to the main flow is positioned somewhat down-stream of the position of the test sample inlet 222,—thus affording time not only for the desired completion of reaction of the test chlorine application in the sample, but also for the controlling operations within the chlorinator (under the practically instantaneous control of the rate controller 300 by the cell 230). Inasmuch as the sample 210a is travelling at the same speed in the sample channel as the main body of liquid in the major part of channel 214, there is ordinarily no need for supplementary timing control such as provided by the valve 97 in Fig. 1 or by the instrumentalities shown in Fig. 3; it being understood that the spacing of pipes 223a and 222 is preferably sufficient to allow for the desired completion of reaction even when the flow is at a maximum rate.

In some cases, the control operations described in connection with Fig. 5 may be attained with other devices. For example, other means may be employed to provide sampling in proportion to the rate of flow; thus for instance, the sample may be withdrawn through a pipe by a pump having its speed controlled in proportion to the rate of flow of the main stream, as in the manner of the motor 24a and pump 22a in Fig. 3, it being understood that in such case the rate of the small capacity chlorinator is not correspondingly varied, but remains at a predetermined constant rate, like the chlorinator 223 of Fig. 5 and for like reasons. It will also be appreciated that in some instances or for some purposes, the invention may be carried out with apparatus differing in a variety of other respects from the specific devices hereinabove described. For instance, in Figs. 1 and 2 the differential converter embodying the levers 60 and 70 may be dispensed with and the joint control of the vacuum in the chlorinator tube 43 by variations of cell voltage and variations of a flow-responsive device, may be effected by a more completely electrical system,—for example, a system of the types described and claimed in the copending application of John R. MacKay, Serial No. 244,054, filed December 5, 1938, for Proportional control systems and procedure, and particularly control means of the sort included in Figs. 13 and 14 of said application, which illustrate arrangements for controlling a chlorinator jointly in accordance with determinations of a chlorine-sensitive cell and a flow-responsive device.

While illustrated in connection with sewage treatment systems and although being of special advantage for such systems, the procedure and apparatus of the invention may be applied to other uses. One such use is in the treatment of water for drinking purposes, as in such cases the changes in the demand for chlorination may also be quite rapid, particularly for certain types of water supply systems. In such case, the liquid is preferably handled in a closed conduit, rather than an open channel, and a Venturi-tube with an associated differential converter of the general type and hydraulic system shown in Wallace Patent No. 1,762,706 may be equipped with a motor-controlled laterally-shiftable fulcrum and conveniently used in lieu of the weir and associated float as shown in Figs. 1 and 2. Conventional Venturi meters may also be connected, like the float 20, to control a differential converter of the type shown in Figs. 1 and 2 or to operate other control means as hereinabove described. Arrangements of the sort exemplified in Figs. 4 and 5 may also be applied for use in water purification, and in such case the sample stream can be drawn from the main conduit by a pump having its speed controlled by a Venturi meter in the main, to provide the desired sampling proportional to the main flow.

In some cases, other types of chlorinators than those controlled by a change of vacuum may be employed, and other feeding or treating devices can be subjected to the same sort of control e. g., dry chemical feeders or other feed apparatus for liquid, solids or gases; the control being in accordance with demand as detected, say from the condition of a sample subjected to a test treatment, which may be of the same character as the principal treatment, or of a different character peculiarly suited for detecting demand. For instance, in a water works where coagulating chemicals are applied ahead of a filter or settling basin, the procedure of this invention may be effectively employed, by substituting a standard test feed of the chemical for the illustrated small capacity chlorinator and substituting a photoelectric cell and inspecting device therefor, for the chlorine-sensitive cell,—so that the feed of coagulating chemical is controlled in response to detected variations in turbidity or color of the sampled material. In other cases, for controlling chlorination, the chlorine-sensitive cell may likewise be replaced by photo-electric means and arrangements provided for producing a color reaction in the test-treated sampling of material (e. g., by using ortho-tolidin) to develop a color in accordance with the residual chlorine content, whereby the determination of color variations by the photo-electric device is utilized to control the rate of chlorine feed.

It will now be seen that the present invention affords a notably accurate and non-hunting control of the treatment of a flowing material in accordance with its actual demand per unit quantity, and is of special and distinct advantage in apparatus and procedures where both the flow variations and the demand changes in the material to be treated, are frequent and substantial. If desired, a second and independent indicating or recording device can be located down-stream of the point of principal treatment, to indicate or record the result of the latter,—whereby a record or other check of the operation will be afforded.

In accordance with the provisions of the patent statutes, I have herein described the principle of operation of my invention, together with the procedure and apparatus which I now consider to represent the most advantageous embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

I claim:

1. A method of controlling the treatment of a flowing material, comprising subjecting the material to a principal treatment, detecting changes in demand by subjecting a portion of the untreated material to a similar test treatment which modifies the condition of the material in a detectable manner and detecting variations in the condition of the resulting treated portion relative to a predetermined standard, and varying the principal treatment of the material in response to said variations in condition, to cause said principal treatment to follow the detected changes in demand.

2. A method of controlling the treatment of a flowing material which varies in rate of flow and in demand for treatment per unit quantity, comprising subjecting the material to a main treatment of which the results are detectable after treatment, controlling said treatment to maintain a uniform result thereof in the material after treatment and inhibiting excess fluctuation in said control, by detecting variations in the demand for treatment, per unit of time, of the flowing untreated material, and controlling the rate of treatment in accordance with the detected variations; said demand variation detecting step including subjecting successive portions of the untreated material, at a place upstream of the place of treatment, to a test which is responsive to variations in demand of the successive portions for treatment per unit quantity, while converting variations in rate of flow of the material into modifications of the result of said test, to determine the aforesaid variations in demand per unit of time, for control of the rate of treatment, and said subjection of portions of the untreated material to a test, comprising subjecting said portions to a treatment of controlled extent, similar to the main treatment, and testing the treated portions to detect the results of the treatment hereof.

3. In apparatus of the character described, the combination, with a chlorinator for treating a flowing liquid and an adjustable translating device whereby said chlorinator may be controlled, of means for withdrawing a sample flow of said liquid before treatment by said chlorinator, means for chlorinating said sample flow at a controlled rate, electrical cell means for testing the chlorinated sample flow to detect changes in the condition of same, and means controlled by the cell means for adjusting said translating device in response to the detected changes.

4. A method of controlling the application, to a flowing material, of a treating substance which requires a substantial period of time to complete its desired treating effect on the material, and which modifies the condition of the material in a detectable manner adapted to vary with the amount of substance applied, comprising detecting the rate of demand of the flowing material for treatment, in accordance with both its rate of flow and its demand per unit quantity, said rate-detecting step including effecting a standard test application of the treating substance to a portion of the material and after completion of the treating effect on said portion, detecting variations in the condition of the treated portion from the desired treating effect; effecting the principal application of the treating substance to the material at a place downstream of that where the aforesaid portion is subjected to test application; and varying the rate of said principal substance application in accordance with detected variations in rate of demand for treatment while correlating and timing the said rate-detecting procedure with control of the rate of substance application to effect substantial coincidence of actual variation in substance application with the arrival of the controlling variation in the material at the point of said application.

5. A method of controlling chlorination of a flow of aqueous liquid, comprising sampling the liquid at a place upstream of the place of the chlorination to be controlled, chlorinating said sampling of liquid at a controlled rate, testing said chlorinated sampling to determine residual chlorine, and varying the rate of the first-mentioned chlorination inversely in accordance with the determined amount of residual chlorine.

6. The method of claim 5 which includes timing the testing step relative to the sampling step and in accordance with the rate of flow of the liquid, to effect substantial coincidence of the controlled variation of chlorination with the arrival, at the place of chlorination, of the variation in liquid condition which effects the corresponding controlling determination of residual chlorine.

7. Apparatus adapted for use in controlling the treatment of flowing material, comprising means for withdrawing successive sample portions of the untreated material, means for testing the sample portions withdrawn by said first mentioned means to detect variations in demand of the material for treatment per unit quantity, means for detecting variations in the rate of flow of the flowing material, an adjustable translating device, and means responsive to both said testing means and said detecting means, for adjusting said translating device in accordance with the demand of the material for treatment per unit of time.

8. A method of controlling chlorination of a flowing aqueous liquid, comprising sampling the liquid before chlorination thereof, treating successive sampled portions to introduce a controlled quantity of chlorine therein, testing said successive portions after treatment to detect differences in the effect of said introduction of chlorine therein, subjecting the main body of flowing liquid to chlorination treatment, and converting detected differences in the effect of treatment of the sampled portions into changes in chlorination treatment of the main body of liquid, to maintain desired uniformity of the effect of said chlorination treatment on said main body of liquid.

9. The method of claim 8, wherein the sampling and treating steps include varying the rate of sampling in accordance with variations of the rate of flow of the main body of liquid, while maintaining the chlorine-introducing treatment of the sampled portions at a constant rate, whereby the detected differences of effect of said introduction reflect variations in rate of flow of the main body of liquid.

10. Apparatus adapted for use in controlling the treatment of flowing material, comprising material-handling means for sampling the material at a rate varying with variations of the rate of flow of the material, means for applying treatment at a predetermined constant rate to the sample of material handled by the first-mentioned means, means for detecting variations in the condition of the treated sampling from a desired result of treatment, an adjustable translating device, and means responsive to said detecting means for adjusting the translating device, to control the latter in accordance with variations of both rate of flow and demand for treatment per unit quantity, of the flowing material.

11. In apparatus of the character described, the combination of control means for controlling apparatus for treating flowing material, of means for sampling the untreated flowing material, associated means for applying a predetermined treatment to the sample of material, means for detecting variations in the condition of the treated sample relative to a predetermined standard condition, and means controlled by said last-mentioned means, for operating the control means in response to the detected variations.

12. The apparatus of claim 11, wherein are provided supplementary means for detecting variations in rate of flow of the material to be treated, and wherein the control-operating means includes associated means responsive to the aforesaid supplementary means, for operating the control means in accordance with changes in rate of flow.

13. The apparatus of claim 11, wherein the sampling means includes regulating means for sampling in accordance with the rate of flow of the material to be treated, and wherein the treatment-applying means is adapted to treat the sample at a constant rate regardless of quantitative variations of the sampling, whereby the changes in condition detected by the detecting means are governed both by changes in rate of flow and by changes in demand for treatment per unit quantity.

14. Apparatus for controlling the rate of a chlorinator for a flowing liquid, comprising a chlorinator for said flowing liquid, means for chlorinating a sample of the liquid untreated by said chlorinator, means for testing the chlorinated sample for residual chlorine, and control means responsive to said testing means and adapted to vary the rate of the chlorinator inversely in accordance with the determination of said testing means.

15. In combination, liquid-handling means, a chlorinator for treating a liquid which flows in said handling means, means for withdrawing a sample of said liquid from said handling means, upstream of the chlorinator, means for treating the sample with chlorination of predetermined character, electrolytic cell means for determining residual chlorine in the treated sample, and means controlled by the cell means for controlling the chlorinator inversely in accordance with the determination of said cell means.

16. In combination, means for handling a flow of liquid, means for sampling liquid therefrom, means for chlorinating the sample at a constant extent per unit quantity, means for detecting residual chlorine content of the chlorinated sample, means for detecting variations in rate of flow of the liquid, and means controlled by both said detecting means for effecting chlorination of the liquid at a rate varying in accordance with the rate of flow and inversely in accordance with the residual chlorine content of the treated sample.

17. In combination, means for handling a flow of liquid, means for sampling liquid therefrom in proportion to the rate of flow of said liquid, means for chlorinating the sample at a constant rate whereby the quantity of chlorine applied per unit quantity varies inversely in accordance with the rate of flow of the liquid, means for detecting residual chlorine content of the chlorinated sample, and means controlled by said detecting means for effecting chlorination of the liquid at a rate varying inversely in accordance with the residual chlorine content of the treated sample.

18. In combination, a vacuum-controlled chlorinator for applying chlorine to a flow of liquid, positionally adjustable means for varying a vacuum to control the rate of the chlorinator, means for applying chlorine to untreated portions of the liquid to be chlorinated, at a predetermined extent per unit quantity, means for electrolytically detecting variations in potential of the portions of liquid treated by said last-mentioned means, control means mechanically responsive to variations in the rate of flow of the liquid to be chlorinated, a lever device having an arm connected to said positionally adjustable vacuum-varying means, an adjacent lever device having an arm connected to said flow-responsive control means, pivot means intermediate said lever-devices for transmitting control from the flow-responsive means to the vacuum-varying means, and means controlled by the electrolytic means for positionally adjusting the pivot means to effect control of the vacuum-varying means in response to the detected variations of potential.

19. The combination of claim 18 in which the means for applying chlorine to untreated portions of liquid comprises means including a conduit for withdrawing a sample flow of the liquid, a chlorinator device for injecting chlorine into said conduit at a constant extent per unit quantity of the sample, means for delivering chlorinated liquid from said conduit to the electrolytic detecting means, and overflow means in said conduit beyond the point of injection of chlorine, including a valve adjustable to vary the time interval between withdrawal of a sample portion of liquid and test of the sample by the electrolytic detecting means.

20. The combination of claim 18 in which the means for applying chlorine to untreated portions of the liquid comprises a conduit for receiving a sample flow of the liquid, a chlorinator device for injecting chlorine into the sample flow in said conduit, a pump for advancing the sample flow in the conduit, means for conjointly adjusting both the rate of the chlorinator device and the speed of the pump, and flow-responsive means for control of said adjusting means, to effect operation of the latter in accordance with variations in flow of the main body of liquid.

21. In combination, a vacuum-controlled chlorinator for applying chlorine to a flow of liquid, adjustable means for varying a vacuum to control the rate of the chlorinator, means for handling the flow of the liquid to be chlorinated, including divided weir means for separating from the main flow of liquid a sample flow having a rate varying in accordance with variations of the main flow and conduit means for carrying said sample flow, means for applying chlorine to said sample flow at a constant rate, means for electrolytically detecting variations in potential of the sample flow after application of chlorine by the last-mentioned means, and means controlled by said electrolytic means for adjusting the vacuum-varying means in response to the detected variations of potential.

22. In combination, liquid-handling means, a chlorinator for treating a liquid which flows in said handling means, means for withdrawing a sample of said liquid from said handling means upstream of the chlorinator, means for treating the sample with chlorination of predetermined character, electrolytic cell means for determining the potential of the treated sample, and means controlled by the cell means for controlling the chlorinator inversely in accordance with the determination of said cell means.

23. A method of controlling chlorination of a flow of aqueous liquid, comprising sampling the liquid at a place upstream of the place of the chlorination to be controlled, chlorinating said sampling of liquid at a controlled rate, testing said chlorinated sampling to determine its potential, and varying the rate of the first-mentioned chlorination inversely in accordance with the determined potential.

DAVID CRAMPTON.

CERTIFICATE OF CORRECTION.

Patent No. 2,269,393. January 6, 1942.

DAVID CRAMPTON.

It is hereby certified that error appears in the printed specification of the above numbered patent requiring correction as follows: Page 1, first column, line 16, for "desired" read --described--; page 3, second column, line 1, for "or" read --on--; page 4, first column, line 64, strike out "of"; page 6, first column, line 4, for "latter" read --later--; page 8, first column, line 70, claim 2, for "hereof" read --thereof--; page 9, first column, line 32, claim 11, for "of" read --with--; and that the said Letters Patent should be read with this correction therein that the same may conform to the record of the case in the Patent Office.

Signed and sealed this 17th day of March, A. D. 1942.

(Seal)

Henry Van Arsdale,
Acting Commissioner of Patents.